United States Patent
Wassingbo et al.

(10) Patent No.: US 9,294,609 B2
(45) Date of Patent: Mar. 22, 2016

(54) EVENTS ON MULTIPLE PHONES

(75) Inventors: Tomas Karl-Axel Wassingbo, Lund (SE); Darius Katz, Malmo (SE)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 1624 days.

(21) Appl. No.: 11/694,112

(22) Filed: Mar. 30, 2007

(65) Prior Publication Data

US 2008/0207184 A1 Aug. 28, 2008

Related U.S. Application Data

(63) Continuation-in-part of application No. 11/679,354, filed on Feb. 27, 2007.

(51) Int. Cl.
*H04M 1/725* (2006.01)
*H04M 3/42* (2006.01)
*H04M 3/54* (2006.01)
*H04W 4/16* (2009.01)

(52) U.S. Cl.
CPC ........ *H04M 1/7253* (2013.01); *H04M 3/42212* (2013.01); *H04M 3/548* (2013.01); *H04M 2250/06* (2013.01); *H04W 4/16* (2013.01)

(58) Field of Classification Search
CPC ....... H04W 4/005; H04W 4/16; H04W 4/206; H04W 76/00; H04W 76/02; H04W 76/023; H04W 84/00; H04W 84/18; H04W 84/20; H04W 88/04; H04W 88/06; H04W 92/18; H04M 3/42; H04M 3/54
USPC ........ 455/410, 411, 416, 455, 517, 445, 11.1, 455/426.1, 428, 456.6, 462, 465, 41.2, 455/552.1, 556.1, 556.2, 127.4, 151.2, 567, 455/466, 412.1–414.4, 418–422.1; 370/312, 274, 310, 310.2, 328, 338, 370/315, 351–356; 379/211.02, 211.03; 715/704, 719, 733, 748, 758, 759, 765, 715/859, 864; 345/418–475; 709/201–246
See application file for complete search history.

(56) References Cited

U.S. PATENT DOCUMENTS

| | | | | |
|---|---|---|---|---|
| 6,125,126 | A * | 9/2000 | Hallenstål | 370/522 |
| 7,024,189 | B2 * | 4/2006 | Wonak et al. | 455/426.2 |
| 7,113,742 | B2 * | 9/2006 | Kindo et al. | 455/11.1 |
| 7,317,919 | B1 * | 1/2008 | Ruf | 455/446 |
| 2002/0098831 | A1 * | 7/2002 | Castell et al. | 455/413 |
| 2002/0132582 | A1 | 9/2002 | Mooney | |

(Continued)

FOREIGN PATENT DOCUMENTS

EP WO-2006/058812 A1 * 6/2006 ............ H04M 1/725

OTHER PUBLICATIONS

International Search Report of International Application No. PCT/IB2007/002728 filed Sep. 20, 2007.

(Continued)

*Primary Examiner* — San Htun
(74) *Attorney, Agent, or Firm* — Renner, Otto, Boisselle & Sklar, LLP.

(57) ABSTRACT

A method and device for distributing an event to more than one electronic device comprising receiving the event on a first electronic device, determining whether the first electronic device is connected to at least one other electronic device, and forwarding the event to the at least one other electronic device if connected.

10 Claims, 9 Drawing Sheets

(56) References Cited

U.S. PATENT DOCUMENTS

| | | | |
|---|---|---|---|
| 2004/0106397 A1* | 6/2004 | Yamagishi et al. | 455/417 |
| 2004/0213212 A1* | 10/2004 | Reding et al. | 370/352 |
| 2005/0107037 A1* | 5/2005 | Delmulle et al. | 455/41.2 |
| 2006/0041600 A1 | 2/2006 | Lehtola et al. | |
| 2006/0116142 A1* | 6/2006 | Cofta | 455/466 |
| 2006/0148420 A1 | 7/2006 | Wonak et al. | |
| 2006/0189349 A1 | 8/2006 | Montulli et al. | |
| 2006/0256734 A1* | 11/2006 | Erhart et al. | 370/254 |
| 2007/0049261 A1* | 3/2007 | Joglekar | 455/416 |
| 2008/0085682 A1* | 4/2008 | Rao | 455/74 |

OTHER PUBLICATIONS

Written Opinion of the International Searching Authority dated Feb. 20, 2008, for International Application No. PCT/IB2007/002728, filed Sep. 20, 2007.

* cited by examiner

EVENTS ON MULTIPLE PHONES

RELATED APPLICATION

This application is a continuation-in-part of U.S. patent application Ser. No. 11/679,354, filed on Feb. 27, 2007, which is hereby incorporated by reference herein in its entirety.

TECHNICAL FIELD OF THE INVENTION

The present invention relates generally to portable communication devices, and, more particularly, to a method and device for forwarding events between more than one phone.

DESCRIPTION OF THE RELATED ART

In recent years, portable communication devices, such as mobile phones, personal digital assistants, mobile terminals, etc., continue to grow in popularity. As the popularity of portable communication devices continues to grow, today's wireless landscape is rapidly changing as mobile phones and networks are being enhanced to provide features and services beyond voice communications. The wireless industry is experiencing a rapid expansion of mobile data services and enhanced functionality. In addition, the features associated with certain types of portable communication devices have become increasingly diverse. To name a few examples, many portable communication devices have text messaging capability, Internet browsing functionality, electronic mail capability, video playback capability, audio playback capability, image display capability and hands-free headset interfaces.

Today, many users have more than one mobile phone. For example, a user may have a personal mobile phone and a business mobile phone and may typically carry both phones at the same time. For example, a user may keep a personal mobile phone in a jacket pocket in a closet while at work, and keep a business mobile phone readily accessible for use during the work day. Keeping track of incoming calls and messages on more than one mobile phone can be difficult and time consuming. For example, the user may not be close to each phone at all times. Thus, when a call or event is received on one or both of the phones the user must promptly locate the phone or miss the call or event.

SUMMARY

To improve the functionality of portable communication devices and to make managing more than one electronic device more convenient, there is a need in the art for a system and method that enables an event (e.g., a call, a text message, a voicemail, an email, notification, etc.) received by one electronic device to be forwarded to another electronic device.

According to one aspect of the invention, there is provided a method of forwarding an event to more than one electronic device comprising receiving the event on a first electronic device, determining whether the first electronic device is connected to at least one other electronic device, and forwarding the event to the at least one other electronic device if connected.

According to another aspect of the invention, the method further comprises storing the event in a memory queue if the first device is not connected with at least one other electronic device.

According to another aspect of the invention, the method further comprises forwarding the stored event to at least one other electronic device when connected therewith.

According to another aspect of the invention, the event includes at least one of a call, a voicemail, a text message, an electronic mail, a multimedia message or an alarm, an incoming communication, a calendar event, a reminder, a RSS feed update, or a notification of a missed communication.

According to another aspect of the invention, the method further comprises analyzing the event to determine whether the event is a forwardable event.

According to another aspect of the invention, the forwarding includes forwarding the event via a local short-range radio communication interface.

According to another aspect of the invention, the local short-range radio communication interface is a Bluetooth network.

According to another aspect of the invention, the local short-range radio communication interface is a wireless local area network.

According to another aspect of the invention, the local short-range radio communication interface is an IEEE 802.11 network.

According to another aspect of the invention, the method further comprises encrypting the event prior to forwarding the event.

According to another aspect of the invention, the method further comprises displaying the encrypted forwarded event only upon entry of a passcode.

According to another aspect of the invention, the method further comprises selecting a sharing level to determine the types of information that are forwardable.

According to another aspect of the invention, there is provided an electronic device comprising call circuitry to establish a call over a communications network, a forwarding circuit operatively coupled to the call circuitry, the forwarding circuit operative to forward an event received by the electronic equipment via the call circuitry to at least one other connected electronic device.

According to another aspect of the invention, the device further comprises a short-range wireless communication interface, wherein the forwarding circuit is further operative to forward via the short-range wireless communication interface the event received by the electronic device to the at least one other electronic device.

According to another aspect of the invention, the forwarding circuit is operative to stream the event to the at least one other electronic device via the short-range wireless communication interface.

According to another aspect of the invention, the forwarding circuit is operative to notify the electronic device of events determined to be forwardable events.

According to another aspect of the invention, the event includes at least one of a call, a voicemail, a text message, an electronic mail, a multimedia message or an alarm, an incoming communication, a calendar event, a reminder, a RSS feed update, or a notification of a missed communication.

According to another aspect of the invention, the electronic equipment is a mobile telephone.

According to another aspect of the invention, the forwarding circuit is operative to automatically forward stored events to the at least one other electronic device.

According to another aspect of the invention, the forwarding circuit is operative to select a sharing level that determines the types of information that is forwardable.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

It should be emphasized that the terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF THE EMBODIMENTS

Figure 1:
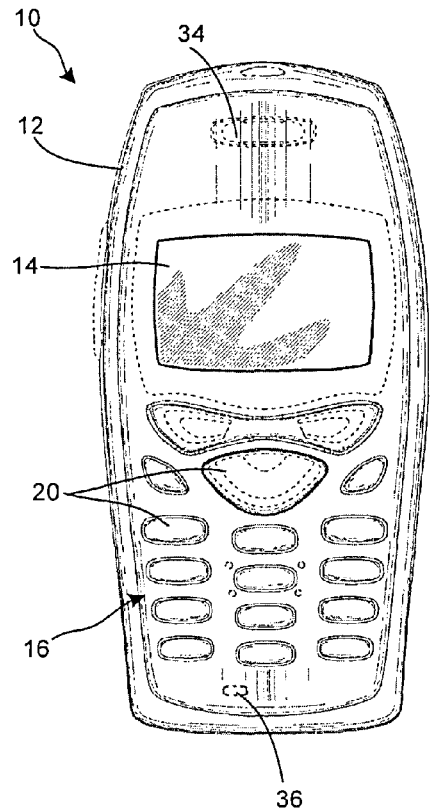
FIG. 1 is a schematic view of a mobile telephone as an exemplary electronic equipment in accordance with an embodiment of the present invention.

The term "electronic equipment" includes portable radio communication equipment. The term "portable radio communication equipment," which herein after is referred to as a "mobile radio terminal," "mobile phone," "mobile device," or "mobile terminal", and the like, includes all equipment such as mobile telephones, pagers, communicators, i.e., electronic organizers, personal digital assistants (PDAs), smartphones, portable communication apparatus or the like. The term "communication device" includes electronic equipment, as well as telephones, such as VoIP based wire line telephones and conventional wire line telephones. The term "communication" includes voice communications (both live and prerecorded), text messages, and email messages (including attachments such as music and videos).

In the present application, the invention is described primarily in the context of a mobile telephone. However, it will be appreciated that the invention is not intended to be limited to a mobile telephone and can be any type of communication device. The present invention will now be described with reference to the drawings, wherein like reference numerals are used to refer to like elements throughout.

Referring initially to FIG. 1, an electronic equipment 10 is shown in accordance with the present invention. The electronic equipment includes a communication rerouting function that is configured to reroute incoming communications (voice, email, text, etc.) to other communication devices, and to receive rerouted communications from other communication devices. The communication rerouting function enables a user to receive calls, messages, data, etc. intended for other communication devices when the other communication devices are not readily accessible. It will be appreciated that the communication rerouting function may be embodied as executable code that may be resident in and executed by the electronic equipment 10.

The electronic equipment in the exemplary embodiment is a mobile telephone and will be referred to as the mobile telephone 10. The mobile telephone 10 is shown as having a "brick" or "block" form factor housing 12, but it will be appreciated that other type housings, such as a clamshell housing or a slide-type housing, may be utilized without departing from the scope of the invention.

The mobile telephone 10 includes a display 14 and keypad 16. As is conventional, the display 14 displays information to a user such as operating state, time, telephone numbers, contact information, various navigational menus, etc., which enable the user to utilize the various features of the mobile telephone 10. The display 14 may also be used to visually display content received by the mobile telephone 10 and/or retrieved from a memory 18 (FIG. 2) of the mobile telephone 10.

Similarly, the keypad 16 may be conventional in that it provides for a variety of user input operations. For example, the keypad 16 typically includes alphanumeric keys 20 for allowing entry of alphanumeric information such as telephone numbers, phone lists, contact information, notes, etc. In addition, the keypad 16 typically includes special function keys such as a "call send" key for initiating or answering a call, and a "call end" key for ending or "hanging up" a call. Special function keys may also include menu navigation keys, for example, for navigating through a menu displayed on the display 14 to select different telephone functions, profiles, settings, etc., as is conventional. Other keys associated with the mobile telephone may include a volume key, an audio mute key, an on/off power key, a web browser launch key, a camera key, etc. Keys or key-like functionality may also be embodied as a touch screen associated with the display 14.

The mobile telephone 10 includes conventional call circuitry that enables the mobile telephone 10 to establish a call and/or exchange signals with a called/calling device, typically another mobile telephone or land line/wire line telephone. However, the called/calling device need not be another telephone, but may be some other device such as an Internet web server, content providing server, etc.

Figure 2:
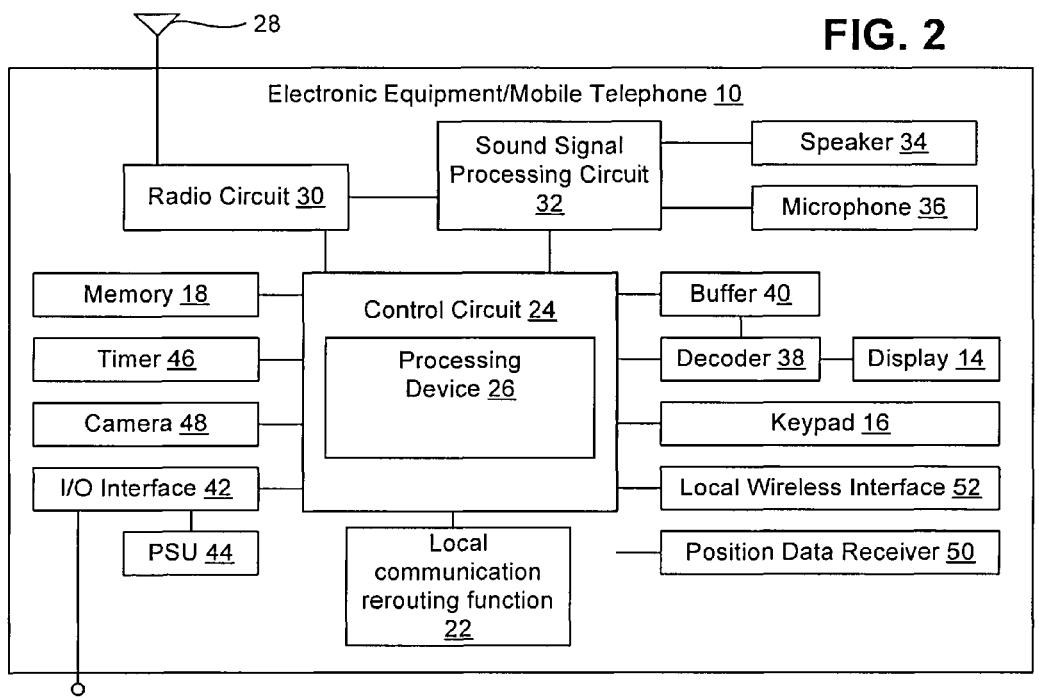
FIG. 2 is a schematic block diagram of the relevant portions of the mobile telephone of FIG. 1 in accordance with an embodiment of the present invention.

FIG. 2 represents a functional block diagram of the mobile telephone 10. With the exception of a communication rerouting function 22, which is preferably implemented as executable logic in the form of application software or code within the mobile telephone 10, the construction of the mobile telephone 10 is otherwise generally conventional. The mobile telephone 10 includes a primary control circuit 24 that is configured to carry out overall control of the functions and operations of the mobile telephone 10. The control circuit 24 may include a processing device 26, such as a CPU, microcontroller or microprocessor. The processing device 26 executes code stored in a memory (not shown) within the control circuit 24 and/or in a separate memory, such as memory 18, in order to carry out conventional operation of the mobile telephone 10. The memory 18 may be, for example, one or more of a buffer, a flash memory, a hard drive, a removable media, a volatile memory, a non-volatile memory or other suitable device. In addition, the processing device 26 executes code in order to perform the communication rerouting function 22.

It will be apparent to a person having ordinary skill in the art of computer programming, and specifically in applications programming for mobile telephones or other items of electronic equipment, how to program a mobile telephone 10 to operate and carry out the functions described herein. Accordingly, details as to the specific programming code have been left out for sake of brevity. Also, while the communication rerouting function 22 is executed by the processing device 26 in accordance with the preferred embodiment of the invention, such functionality could also be carried out via dedicated hardware, firmware, software, or combinations thereof, without departing from the scope of the invention. Any of these implementations may be referred to as a communication rerouting circuit.

Continuing to refer to FIGS. 1 and 2, the mobile telephone 10 includes an antenna 28 coupled to a radio circuit 30. The radio circuit 30 includes a radio frequency transmitter and receiver for transmitting and receiving signals via the antenna 28 as is conventional. The radio circuit 30 may be configured to operate in a mobile communications system, as well as to receive audiovisual content. For example, the receiver may be an IP datacast compatible receiver compatible with a hybrid network structure providing mobile communications and DVB-H based or similar services. Other receivers for interaction with a mobile radio network or broadcasting network are possible and include, for example, GSM, CDMA, WCDMA, MBMS, WiFi, WiMax, DVB-H, ISDB-T, etc.

The mobile telephone 10 further includes a sound signal processing circuit 32 for processing audio signals transmitted by/received from the radio circuit 30. Coupled to the sound processing circuit 32 are a speaker 34 and a microphone 36 that enable a user to listen and speak via the mobile telephone 10 as is conventional. The radio circuit 30 and sound processing circuit 32 are each coupled to the control circuit 24 so as to carry out overall operation.

The mobile telephone 10 also includes the aforementioned display 14 and keypad 16 coupled to the control circuit 24. The display 14 may be coupled to the control circuit 24 by a video decoder 38 that converts video data to a video signal used to drive the display 14. The video data may be generated by the control circuit 24, retrieved from a video file that is stored in the memory 18 or derived from an incoming video data stream received by the radio circuit 30. Prior to being fed to the decoder 38, the video data may be buffered in a buffer 40.

The mobile telephone 10 further includes one or more I/O interface(s) 42. The I/O interface(s) 42 may be in the form of typical mobile telephone I/O interfaces and may include one or more electrical connectors. As is typical, the I/O interface(s) 42 may be used to couple the mobile telephone 10 to a battery charger to charge a battery of a power supply unit (PSU) 44 within the mobile telephone 10. In addition, or in the alternative, the I/O interface(s) 42 may serve to connect the mobile telephone 10 to a wired personal hands-free adaptor (not shown). Further, the I/O interface(s) 42 may serve to connect the mobile telephone 10 to a personal computer or other device via a data cable. The mobile telephone 10 may receive operating power via the I/O interface(s) 42 when connected to a vehicle power adapter or an electricity outlet power adapter.

The mobile telephone 10 may also include a timer 46 for carrying out timing functions. Such functions may include timing the durations of calls, generating the content of time and date stamps, etc. The mobile telephone 10 may include a camera 48 for taking digital pictures and/or movies. Image and/or video files corresponding to the pictures and/or movies may be stored in the memory 18. The mobile telephone 10 also may include a position data receiver 50, such as a global positioning system (GPS) receiver, Galileo satellite system receiver or the like. The mobile telephone 10 also may include a local wireless interface 52, such as an infrared transceiver and/or an RF adaptor (e.g., a Bluetooth adapter), for establishing communication with an accessory, hands-free adaptor, another mobile radio terminal, computer or other device.

The mobile telephone 10 may be configured to transmit, receive and process data, such as text messages (e.g., a short message service (SMS) formatted message), electronic mail messages, multimedia messages (e.g., a multimedia messaging service (MMS) formatted message), image files, video files, audio files, ring tones, streaming audio, streaming video and so forth. Processing such data may include storing the data in the memory 18, executing applications to allow user interaction with data, displaying video and/or image content associated with the data, broadcasting audio sounds associated with the data and so forth.

Figure 3:
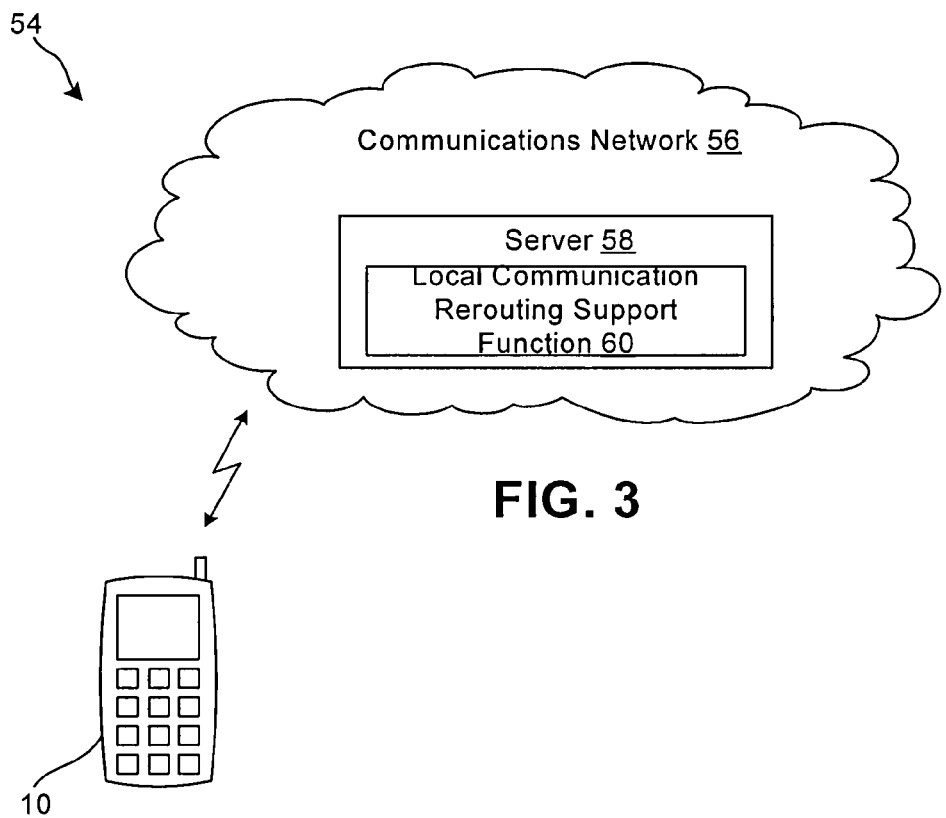
FIG. 3 is a schematic diagram of an exemplary communications system in which the mobile telephone of FIG. 1 may operate.

With additional reference to FIG. 3, the mobile telephone 10 may be configured to operate as part of a communications system 54. The system 54 may include a communications network 56 having a server 58 (or servers) for managing calls placed by and destined to the mobile telephone 10, transmitting data to the mobile telephone 10 and carrying out any other support functions. The server communicates with the mobile telephone 10 via a transmission medium. The transmission medium may be any appropriate device or assembly, including, for example, a communications tower, another mobile telephone, a wireless access point, a satellite, etc. Portions of the network may include wireless transmission pathways. The network 56 may support the communications activity of multiple mobile telephones 10, although only one mobile telephone 10 is shown in the illustration of FIG. 3.

In one embodiment, the server 58 may operate in stand alone configuration relative to other servers of the network 52 or may be configured to carry out multiple communications network 58 functions. As will be appreciated, the server 58 may be configured as a typical computer system used to carry out server functions and may include a processor configured to execute software containing logical instructions that embody the functions of the server 58. Those functions may include functions that are complimentary to the operation of the communication rerouting function 22 of the mobile telephone 10, and will be collectively referred to as a communication rerouting support function 60.

Moving now to FIGS. 4-7, several exemplary implementations of communication devices and/or systems implementing a communication rerouting function in accordance with the invention are shown. Beginning with FIG. 4, a first communication device 70 (e.g., a wire line telephone) is communicatively coupled to computer 72 (e.g., a home computer coupled to the internet for providing VoIP communications capability). The computer 72 may be used to communicate with a VoIP based server 74 so as to provide VoIP communications as is conventional. A second communication device 76 (e.g., electronic equipment embodied as a mobile telephone) is communicatively coupled to the computer 72 via a wireless connection 78 (e.g., a WiFi connection or a Bluetooth connection or other short range communication connection). In normal operation, communications from the VoIP server 74 are routed to a communication device based on an IP address associated with the communication device. For example, communications intended for the first communication device 70, based on the IP address, are transmitted from the VoIP server 74 to the computer 72. The computer 72 then routes the communications to the first communication device 70 using conventional techniques.

If an individual is made aware that a communication is being directed to the first communication device 70 (e.g., the individual hears the first communication device ringing) and he wishes to receive the communications intended for the first communication device 70 via the second communication device 76, then the individual can initiate a rerouting request. This may be accomplished, for example, by pressing a function key or the like on the second communication device 76, wherein activation of the function key represents a request to reroute a communication. This request or command, which may be encapsulated as a SIP script or the like, for example, then can be transmitted via the WiFi connection 78 to the computer 72. The SIP script then can be executed by the computer 72 to implement the rerouting request. More specifically, the SIP script instructs the computer 72 to answer the wire line call and, internal to the computer 72, reroute the call to the second communication device 76 via the WiFi connection 78, for example. Further, in rerouting the communication, transcoding (e.g., using a different CODEC) may or may not be implemented in the computer 72 depending one or more factors relating to the first and/or second communication devices 70 and 76.

The rerouting process may be implemented by using the computer 72 as a bridge. For example, the incoming communication may be provided on a first port (e.g., a modem, broadband port, etc.—not shown) of the first computer 72. The first communication device 70 may be communicatively coupled internally within the computer 72 to a second port (e.g., a serial port or a USB port—not shown), communicating with the WiFi short range communications device. Then, to reroute the communication, the computer 72 can send data packets from the first port to the second port, and vice versa.

Alternatively, the computer 72 may issue a new routing table extension (e.g., provide a new IP address to the incoming communication, such as the IP address of the second communication device 76). As a result, the communication, instead of terminating at the first communication device 70, will continue routing to the new IP address (i.e., the second communication device 76 in this example) using, for example, the internet. In other words, the computer 72 simply provides a new destination IP address, and reroutes the communication via the internet (or via WiFi) to the new destination.

Further, as an incoming communication for the first communication device 70 is detected by the computer 72, the computer 72 may transmit a signal or the like to the second communication device 76 (e.g., a SIP encapsulated script via the WiFi connection 78). This signal then can be used by the second communication device 76 to alert the individual of an incoming communication intended for the first communication device 70 (e.g., by ringing or other audible or visual means). Additionally, the type of alert or the sound of the alert produced on the second communication device 76 may be based on the intended receiver of the communication (e.g., a first ring tone may be provided for communications intended for the first communication device 70, and a second, different ring tone may be provided for communications intended for the second communication device 76). The user then can have the call rerouted to the second communication device 76 by initiating a reroute request as described above. Providing notification at the second communication device 76 of an incoming communication for the first communication device 70 is advantageous, particularly if the individual cannot hear or otherwise be notified of the incoming communication on the first communication device 70 (e.g., he cannot hear the wire line telephone ringing). Accordingly, in the example of FIG. 4, the communication rerouting function is primarily implemented in the computer 72.

While the above example describes how communications may be rerouted from the first communications device 70 to the second communication device 76, it will be appreciated that the opposite is possible. That is, calls directed to the second communication device 76 may be rerouted to the first communication device 70. This is true for all of the examples presented herein, but for sake of brevity, only the following example is provided.

Figure 4:
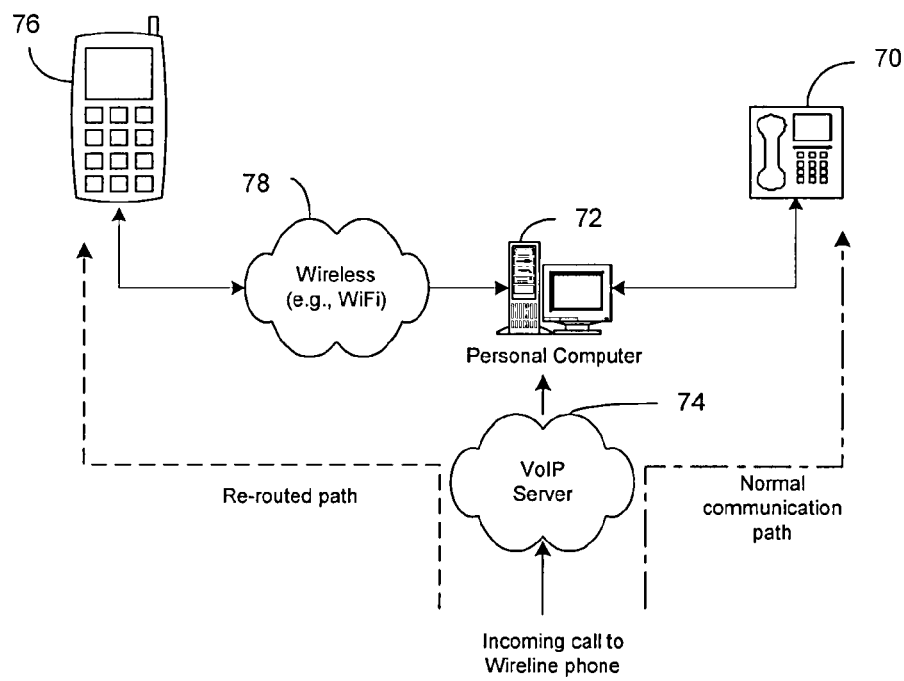
FIG. 4 is a schematic diagram illustrating an exemplary communication rerouting operation in accordance with the invention.

For example, in FIG. 4, the second communication device 76 may be receiving a VoIP communications via computer 72 and WiFi connection 78. An individual hears the second communication device ringing, but is a considerable distance from the second communication device 76 (e.g., on a different floor of a house). However, the individual may be near the first communication device 70 (i.e., the VoIP based wire line phone). In this case, the individual may pick up the first communication device 70 and send a rerouting request in a manner described above (e.g., via a function key or the like). The rerouting request is received by the computer 72, which then intercepts the VoIP call intended for the second communication device 76 and reroutes it to the first communication device 70 in a manner similar to that discussed above.

Figure 5:
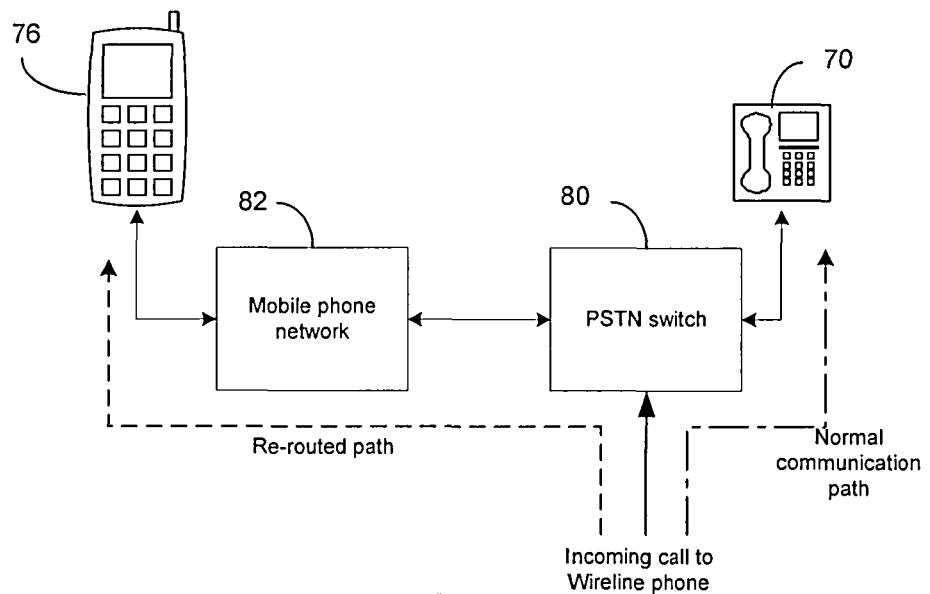
FIG. 5 is a schematic diagram illustrating another exemplary communication rerouting operation in accordance with the invention.

FIG. 5 illustrates another exemplary implementation of a communication rerouting system, wherein the first communication device 70 is communicatively coupled to a public switched telephone network switch (PSTN) 80, and the second communication device 76 is coupled to a mobile telephone network switch 82 (e.g., a conventional wireless communication link with a mobile service provider). The PSTN switch 80 and the mobile telephone network switch 82 may exchange information as is conventional so as to provide voice and/or data communications to the respective first and second communication devices 70 and 76. In normal operation, communications intended for the first communication device 70 are accepted by the PSTN switch 80 and then routed to the first communication device 70.

If an individual wishes to receive communications intended for the first communication device 70 via the second communication device 76, he may initiate a rerouting request as described above (e.g., pressing a function key on the second communication device, which initiates the rerouting request). The request, however, instead of being sent to the computer 72, is sent to the mobile telephone network switch 82 and/or the PSTN switch 80. The request from the second communication device 76 may be in the form of a call back to the mobile telephone network switch 82 (e.g., a call to a specific number of the service provider used for rerouting requests), an SMS message to the switch 82, a message embedded in a data packet service (e.g., GPRS, EGPRS, EDGE, HSDPA, CDMA, etc.) to the switch 82, or any other means available to communication devices for communicating the request to the switch 82. Once received by the mobile telephone network switch 82, the information is processed (e.g., an identifier such as a phone number specific to the second communication device 76 is included along with the rerouting request) and the processed information is forwarded to the PSTN switch 80. The PSTN switch 80 then receives and executes the rerouting request, and reroutes the communications intended for the first communication device 70 to the second communication device 76 (e.g., the PSTN switch 80 routes the call to the mobile telephone network switch 82 with the identifier (e.g., phone number) of the second communication device 76).

In a variation of the above, if the first communication device 70 is a VoIP communication device, then instead of communicating to the PSTN switch 80, the mobile telephone network switch 82 would provide the rerouting request to a VoIP server. In this example, the wire line number is an IP address for the VoIP server. Accordingly, in the exemplary system of FIG. 5, the PSTN switch 80 (or a VoIP server) and mobile telephone network switch 82 implement the communication rerouting function.

Figure 6:
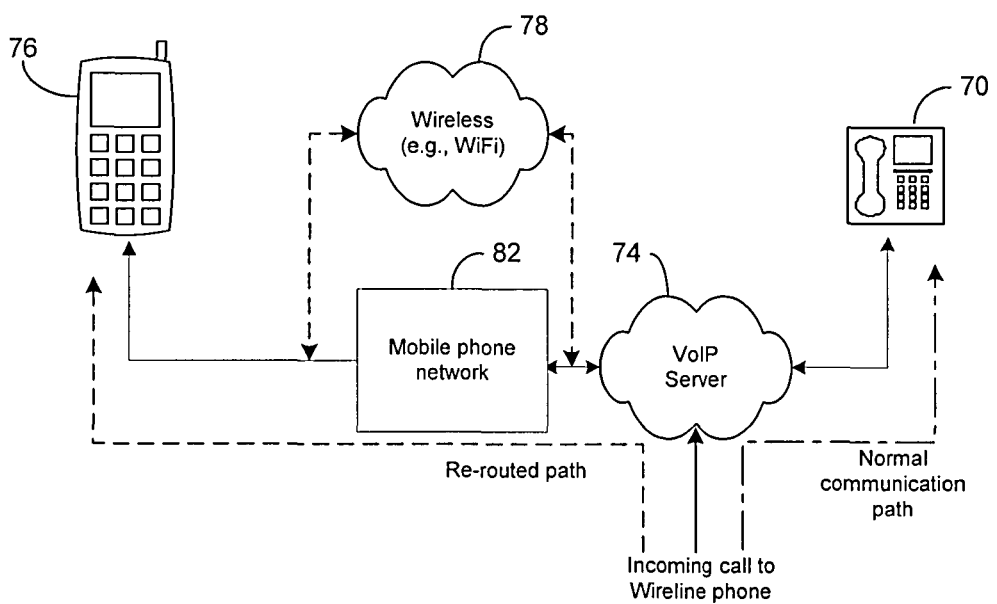
FIG. 6 is a schematic diagram illustrating yet another exemplary communication rerouting operation in accordance with the invention.

FIG. 6 shows yet another exemplary implementation of a communication rerouting system, wherein the first communication device 70 (e.g., a VoIP wire line phone) is communicatively coupled to VoIP server 74 (e.g., via a DSL or cable modem (not shown) coupled to the internet), and the second communication device 76 also is communicatively coupled to the VoIP server 74 (e.g., via an internet connection provided by the mobile phone switch 82 or via a WiFi connection 78 to the VoIP server 74). In normal operation, communications intended for the first communication device 70 (which are identified using an IP address) are accepted by the VoIP server 74 and then routed to the first communication device 70. If an individual wishes to receive communications intended for the first communication device 70 via the second communication device 76, he may initiate a rerouting request as described above.

In FIG. 6, the rerouting request can be initially sent to the mobile telephone network switch 82 (e.g., via a call to a specific number, an SMS message, etc.), which can process the request as discussed above (e.g., the mobile telephone network switch 82 includes an identifier for the second communication device 76 and then sends the request to the VoIP server 74). The form of the request from the mobile telephone network switch 82 to the VoIP server 74 may be in the form of a SIP script or the like that may be executed by the VoIP server 74. The VoIP server 74 executes the script so as to reroute the communication to the second communication device 76. For example, the VoIP server 74, instead of providing the communication to the first communication device 70, may provide the mobile telephone network switch 82 with the communication along with an identifier (e.g., a telephone number or IP address of the second communication device 76 as provided in the request) and then the mobile telephone network switch 82, via conventional mobile communication channels or via VoIP based channels, routes the communication to the second communication device 76.

Alternatively, the second communication device 76 may be communicatively coupled to the VoIP server 74 via the WiFi connection 78. In this scenario, the rerouting request may be processed by the second communication device 76 and communicated directly to the VoIP server 74. The request may be in the form of a SIP script, wherein the request includes an IP address of the second communication device 76. The VoIP server 74, based on the IP address provided in the SIP script, sends the communication to the second communication device 76 as a VoIP based communication. Accordingly, in the exemplary system of FIG. 6, the VoIP server 74 and/or the mobile telephone network switch 82 implement the communication rerouting function.

Figure 7:
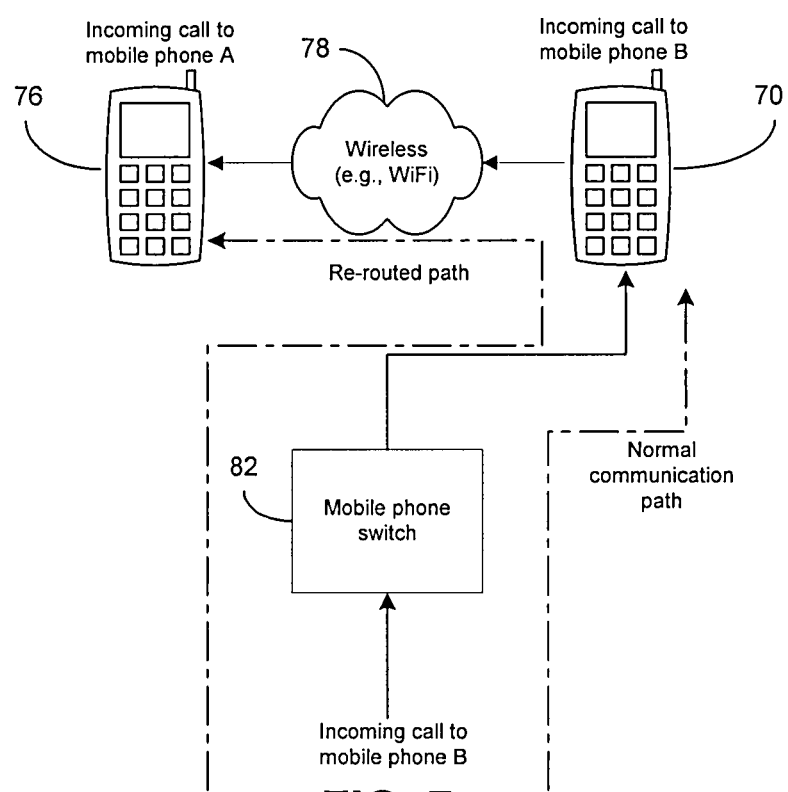
FIG. 7 is a schematic diagram illustrating another exemplary communication rerouting operation in accordance with the invention.

FIG. 7 shows yet another exemplary implementation of a communication rerouting system. In the example of FIG. 7, the first communication device 70 and the second communication device 76 both are mobile telephones (e.g., a work mobile phone and a personal mobile phone), each of which may be communicatively coupled to the mobile telephone network switch 82. Further, each communication device 70 and 76 includes a wireless interface (e.g., a WiFi interface or a Bluetooth or other short range interface), which enables the first and second communications devices 70 and 76 to establish a WiFi connection 78 or the like so as to exchange communication data.

In normal operation, communications intended for the first communication device 70 are accepted by the mobile telephone network switch 82 and then routed to the first communication device 70, and communications intended for the second communication device 76 are accepted by the mobile telephone network switch 82 and then routed to the second communication device 76, as is conventional. If an individual wishes to receive the communications intended for one communication device on the other communication device (e.g., accept a communication intended for the first communication device 70 via the second communication device 76), he may initiate a rerouting request as described above (e.g., via function key or the like). Assuming the second communication device 76 will be used to receive a communication intended for the first communication device 70, the rerouting request, which may include a SIP script or the like, may be sent from the second communication device 76 directly to the first communication device 70 via the WiFi connection 78. The first communication device 70 may execute the script and in response, the first communication device 70 sends the communication data intended for the first communication device 70 to the second communication device 76, and the second communication device 76 sends communication data received via its microphone, keypad, or other input means back to the first communication device 70 (which then sends the data to the mobile telephone network switch 82). In other words, the second communication device 76 acts as a headset for the first communication device, while the first communication device handles communications with the mobile telephone network switch 82. Further, the communication data may be sent as streaming data via the WiFi connection 78.

Alternatively, the first and second communications devices 70 and 76 may be configured as cluster, such that they automatically communicate events between each other via WiFi connection 78. In other words, the individual need not manually initiate the rerouting request. Instead, notification of an event may be automatically sent (e.g., via WiFi) from the first communication device 70 to the second communication device 76 (and vice versa), and the individual may simply pick up the second communication device 76 to receive communications directed to the first communication device 70.

If the communication devices 70 and 76 are not within range of one another when an event occurs (e.g., an incoming call), notification of the event may be provided at a later time (e.g., when the two devices are again within range of one another). For example, if an incoming call is made on the first communication device 70 and the second communication device 76 is not within range of the first communication device at the time of the call, then when the two communication devices 70 and 76 are again within range of one another, a "missed call" event may be transmitted from the first communication device 70 to the second communication device 76. In this manner, the user may be notified of the missed call on the first communication device 70.

Other than the automatic communication of events, operation of the communication devices 70 and 76 as a cluster is substantially the same as manual operation (i.e., one communication device acts as a head set for the other communication device, and data may be exchanged between the respective communication devices via a streaming connection, or other format).

The above noted events may include, for example, notification of an incoming communication, such as a call, missed call, email, text message, etc. Further, the event and/or notification may include or otherwise trigger an audible and/or visual alert that is provided on the first and/or second communication device 70 and 76. As will be appreciated, different audible and/or visual alerts may be utilized for different types of events (e.g., a first ring tone for voice communications intended for the first communication device 70, a second ring tone for voice communications intended for the second communication device 76, a third ring tone for text messages intended for the first communication device 70, etc.). Further, the communication can be either Circuit Switched Voice or data, including VoIP data, but also SMS, email and/or Instant Messaging.

For example, communications may be received by the first communication device 70 as is conventional. Then, upon receiving the rerouting request, the first communication device 70 streams the received communications to the second communications device 76 via the WiFi connection 78. Similarly, communications input into the second communication device 76 (e.g., data obtained from the second communication device's input means, such as the microphone, keypad, etc.) may be streamed back to the first communication device 70. The first communication device 70 then can provide the communications received from the second communication device 76 to the mobile phone switch 82. Thus, the first communication device 70 effectively acts as a bridge between the second communication device 76 and the mobile phone network 82. The configuration of FIG. 7 is advantageous, for example, in that it enables the individual to place one of the communication devices (e.g., the first communication device 70) in an easy to carry and out of the way location (e.g., in a bag, purse, etc.), while carrying the second communication device 76 in a readily accessible location (e.g., on a belt clip). Even though the first communication device 70 is not necessarily readily accessible, voice communications directed to it can be easily received.

The rerouting function may be implemented in both communication devices. Preferably, the communication device for which the communication is intended becomes a bridge for the communication device for which the communication was not intended. For example, if a communication is intended for the first communication device 70, the first communication device acts as the bridge between the second communication device 76 and the mobile telephone network switch 82 (assuming the communication is answered on the second communication device 76). If a communication is intended for the second communication device 76, then the second communication device 76 acts as a bridge between the first communication device 70 and the mobile telephone network switch 82 (assuming the communication is answered on the first communication device 70). Accordingly, in the example of FIG. 7, the rerouting function is implemented by the first and/or second communication devices 70 and 76.

Figure 8:
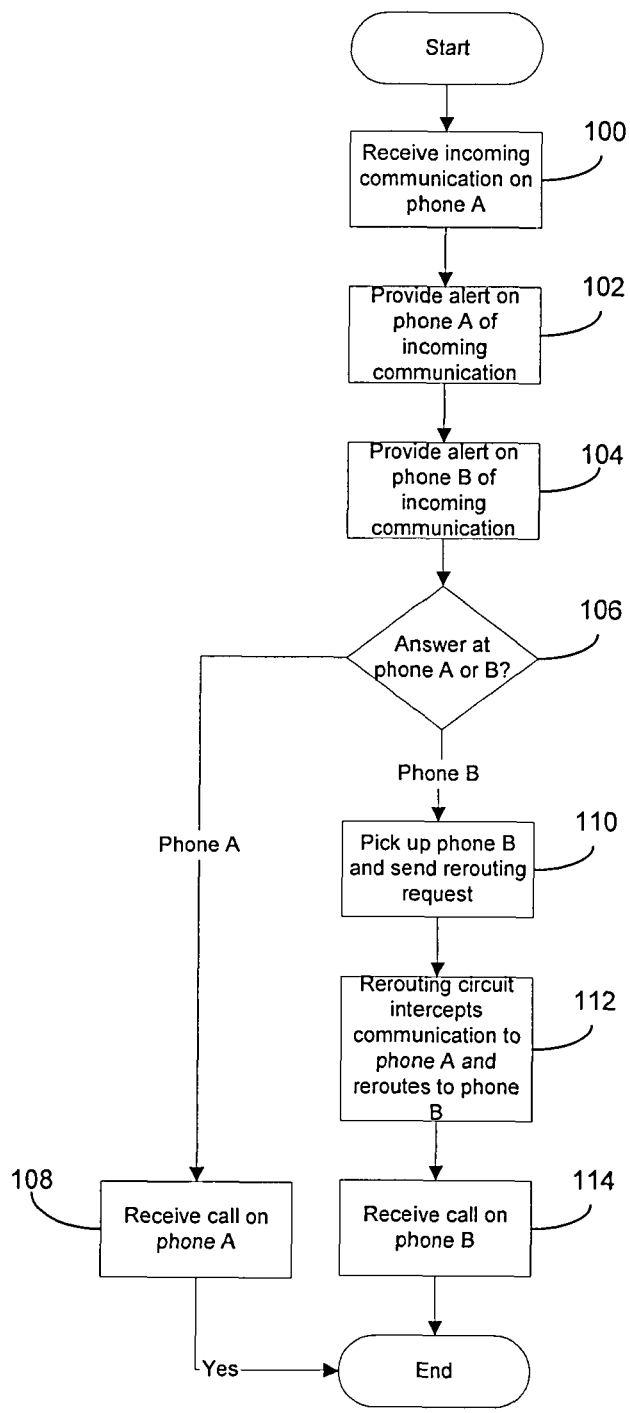
FIG. 8 is a flow chart of an exemplary communication rerouting method in accordance with the present invention.

Referring now to FIG. 8, an exemplary method of providing call rerouting for a user of electronic equipment is depicted. The exemplary method of FIG. 8 describes the steps that may be executed in rerouting a voice communication from the electronic equipment to other communication devices. Further, while the message rerouting function 22 is described as residing primarily on the mobile telephone 10, portions may reside in other locations. For example, portions of the message rerouting function 22 may reside on the server 58 (e.g., within the message rerouting support function 60), on another PC (not shown) or on other communication devices. The functionality of the method may be embodied as executable code, such as in the form of the message rerouting function 22 and/or the message rerouting support function 60, or any other suitable form, including software, firmware, dedicated circuit components, a program stored on a computer readable media or in machine usable medium, and so forth.

Although the illustrated method shows a specific order of executing functional logic blocks, the order of execution of the blocks may be changed relative to the order shown. Also, two or more blocks shown in succession may be executed concurrently or with partial concurrence. Certain blocks also may be omitted. In addition, any number of commands, state variables, semaphores or messages may be added to the logical flow for purposes of enhanced utility, accounting, performance, measurement, troubleshooting, and the like. It is understood that all such variations are within the scope of the present invention.

Beginning with block 100 of FIG. 8, an incoming communication is received at a first communication device (e.g., a wire line telephone, electronic equipment embodied as a mobile telephone, etc.). For example, a call, text message, email, etc. may be made or otherwise sent to the first communication device. At block 102, the first communication device may provide some local indication of the incoming communication. For example, the first communication device may provide an audible signal (e.g., a ring tone or the like) to alert the user of the incoming communication.

At block 104, the first communication device may optionally provide a notification of the incoming communication to a second communication device (e.g., another wire line phone, electronic equipment etc.). This notification may be provided to the individual as an alert (e.g., a ringing, vibration, etc. on the second communication device).

At block 106, the individual decides whether to answer the communication via the first communication device or the second communication device. If the individual chooses to answer the communication on the first communication device, then at step 108, the communication is answered and the method ends.

If the individual chooses to answer the communication at the second communication device, then at block 110, a rerouting request is transmitted from the second communication device to a rerouting circuit. The rerouting circuit may reside in the first communication device, or it may reside elsewhere, such as within a wire line phone network switch, a VoIP phone network, a personal computer, and/or a mobile telephone network switch.

The rerouting request may be manually initiated (e.g., via manual activation of a function key or the like on the second communication device) or automatically initiated (e.g., multiple communication devices are configured as a cluster), wherein the communication device receiving the communication automatically notifies the other communication devices of the incoming message. The rerouting request can include identification information (e.g., a phone number, IP address, etc.) that uniquely identifies the communication device making the rerouting request. The identification information enables the rerouting circuit to route the communication to the appropriate communication device.

At block 112, the rerouting circuit intercepts the communication intended for the first communication device and, using the identification information from the rerouting request, reroutes the communication to the second communication device. Rerouting may be implemented using a WiFi connection between the first and second communication devices, wherein the communication is streamed between the communication devices. Alternatively, rerouting may be implemented via the wire line network switch, mobile telephone network switch, VoIP server, or the like. At block 114, the communication may be answered at the second communication device.

Figure 9:
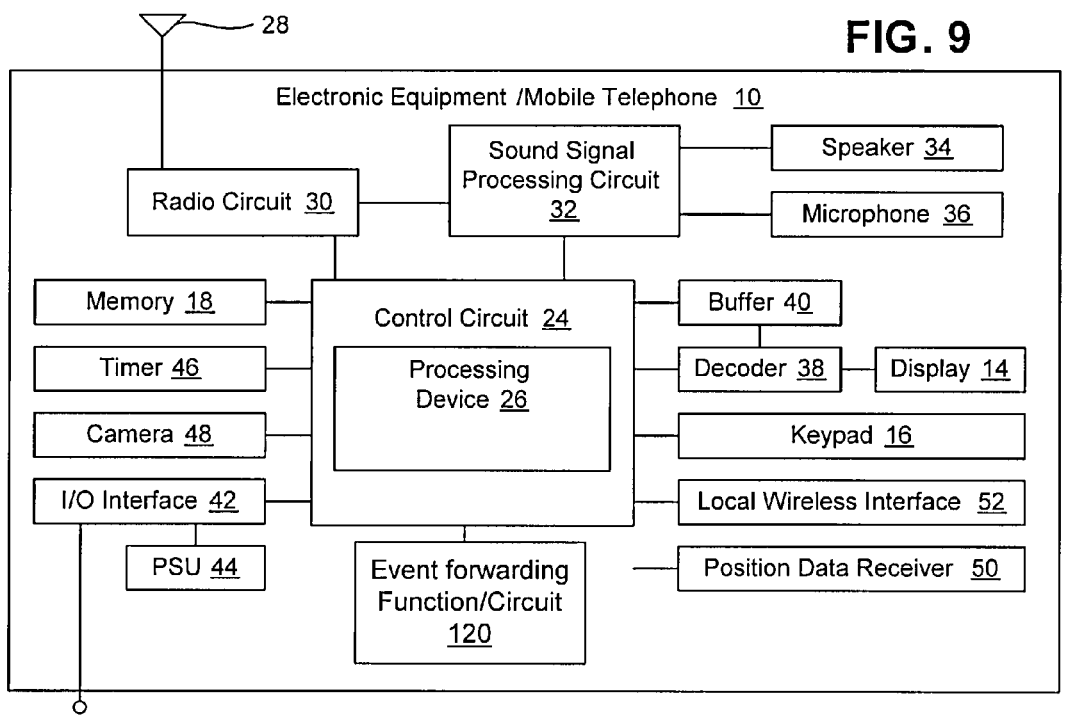
FIG. 9 is a schematic block diagram of the relevant portions of the mobile telephone of FIG. 1 in accordance with another embodiment of the present invention.

FIG. 9 represents another functional block diagram of the mobile telephone 10. The mobile telephone 10 in FIG. 9 is essentially identical to the mobile phone 10 in FIG. 2, with the exception of an event forwarding function/circuit 120 in place of the local communication rerouting function 22 in FIG. 2.

Figure 10:
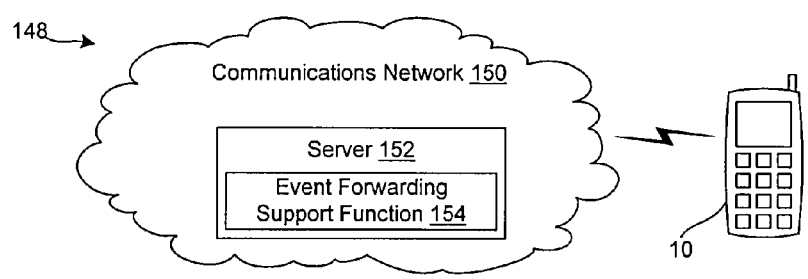
FIG. 10 is a schematic diagram of a communications system in which the mobile telephone of FIG. 9 may operate.

As will be appreciated with additional reference to FIG. 10, the mobile telephone 10 may be configured to operate as part of a communications system 148. The system 148 may include a communications network 150 having a server 152 (or servers) for managing calls placed by and destined to the mobile telephone 10, transmitting data to the mobile telephone 10 and carrying out any other support functions. The server 152 communicates with the mobile telephone 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 150 may support the communications activity of multiple mobile telephones 10 and other types of end user devices.

As will be appreciated, the server 152 may be configured as a typical computer system used to carry out server functions and may include a processor configured to execute software containing logical instructions that embody the functions of the server 152 and a memory to store such software. In one embodiment, the server 152 may be configured to store and execute an event forwarding support function 154 that interacts with the event forwarding function 120 of the mobile telephone 10. Details of the event forwarding support function 154 will be described below in greater detail. In one embodiment, the event forwarding support function 154 may be a program stored on a computer or machine readable medium. The event forwarding support function 154 may be a stand-alone software application or may form a part of a software application that carries out additional tasks related to the functions of the server 154.

Figure 11:
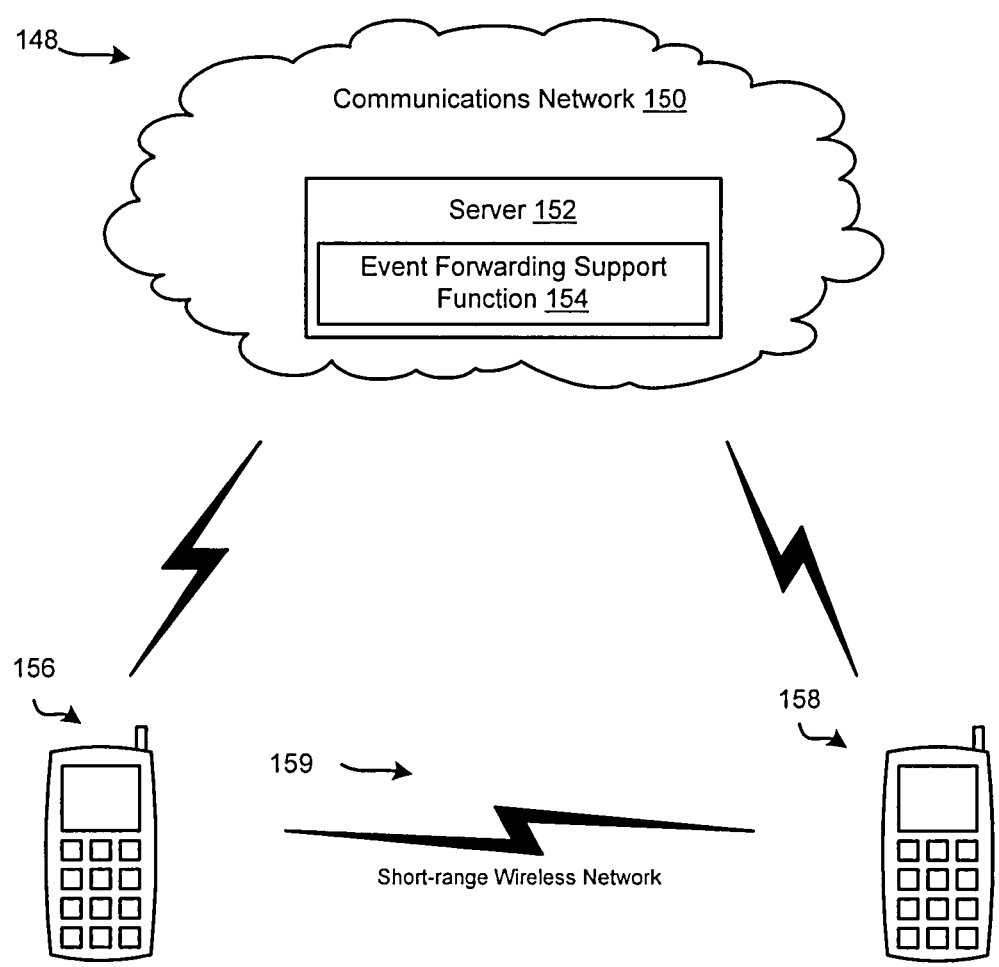
FIG. 11 is a schematic diagram representing an exemplary communications system in which two mobile telephones as shown in FIG. 9, a personal mobile telephone and a business mobile telephone, can be used.

Turning to FIG. 11, an exemplary communications system 148 including a personal mobile phone 156 and business mobile phone 158 is illustrated. The personal mobile phone 156 and business mobile phone 158 are each connected to the communications network 150, and/or to each other (e.g., paired), via the short-range wireless communications network 159. Events received by the personal mobile phone 156 can be forwarded to the business mobile phone 158 via the short-range wireless communications network 159 and vice-versa, as will now described.

In this description, the term "forwarding electronic device" or "forwarding phone" refers to the device or phone that is forwarding an event. The term "receiving electronic device" or "receiving phone" refers to the device or phone that is receiving a forwarded message from the forwarding device or phone. In some instances, the terms "first phone" and "second phone" are used in place of the terms forwarding phone and receiving phone, respectively. It will be appreciated that both a forwarding device or phone and a receiving device or phone are capable of receiving events from the communications network. Further, a device or phone can be both a forwarding device or phone and a receiving device or phone, depending on the circumstances.

Figure 12:
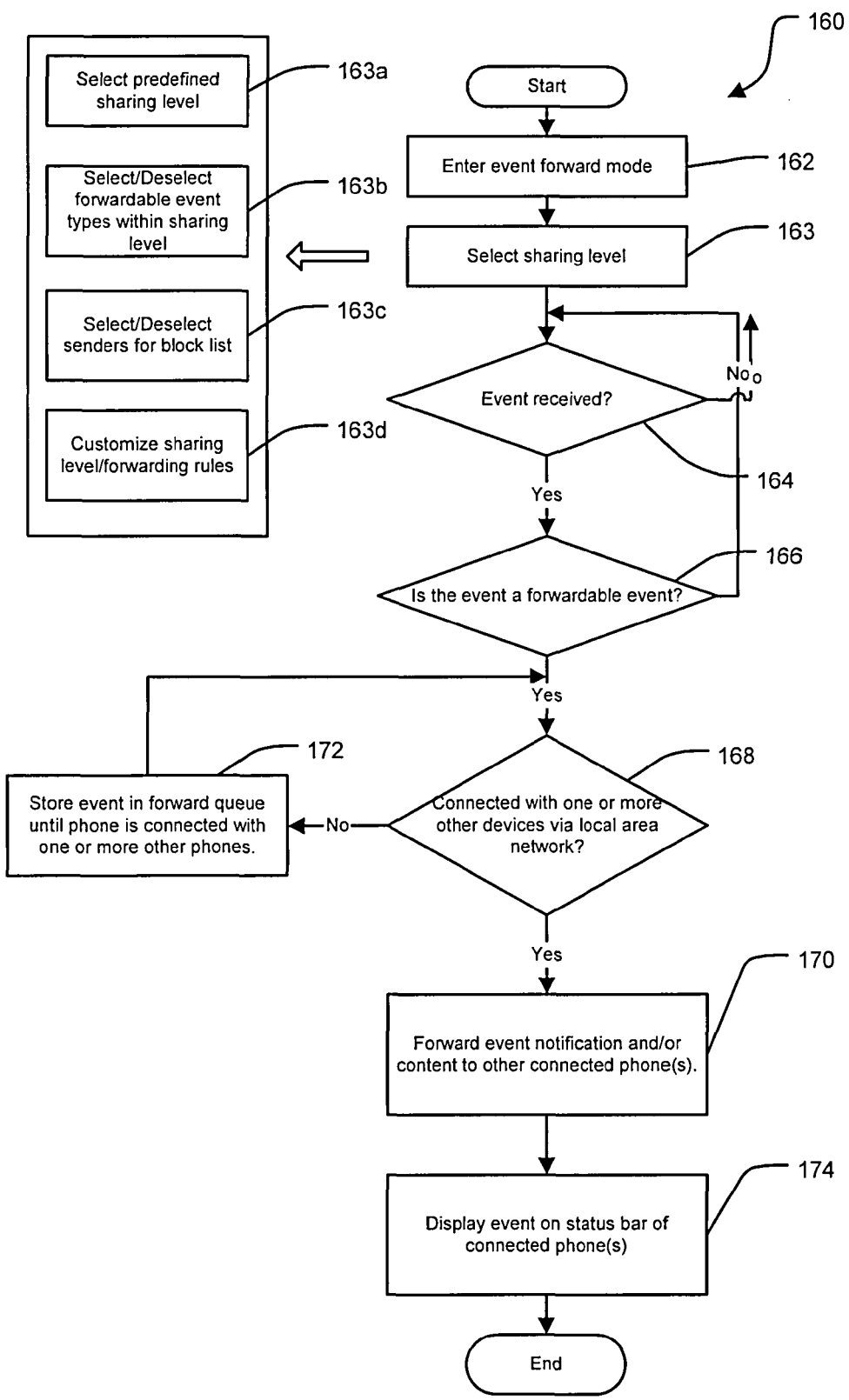
FIG. 12 is a flow chart representing an exemplary method of forwarding events using the mobile telephones of FIG. 11.

With additional reference to FIG. 12, illustrated are logical operations to implement exemplary method 160 of forwarding events. The exemplary method 160 may be carried out by executing an embodiment of the event forwarding function 120, for example. Thus, the flow chart of FIG. 12 may be thought of as depicting steps of a method carried out by the mobile telephone 10. Although FIG. 12 shows a specific order of executing functional logic blocks, the order of executing the blocks may be changed relative to the order shown. Also, two or more blocks shown in succession may be executed concurrently or with partial concurrence. Certain blocks also may be omitted. In addition, any number of functions, logical operations, commands, state variables, semaphores or messages may be added to the logical flow for purposes of enhanced utility, accounting, performance, measurement, troubleshooting, and the like. It is understood that all such variations are within the scope of the present invention.

Beginning with block 162, an event forward mode is entered either on the phone from which events are forwarded (forwarding phone) or on one or more phones to which events will be forwarded (receiving phone), or both. For example, if events from a personal mobile phone 156 are to be forwarded to a business mobile phone 158, then an event forward mode can be entered on the personal mobile phone 156 indicating that messages are to be forwarded to the business mobile phone 158. In this regard, an identifier, such as the phone number and/or MAC address of the business mobile phone 158, may be used to identify the phone to which events are to be forwarded. The business mobile phone 158 can be configured to automatically accept forwarded events from the personal mobile phone 156. Alternatively, a forward events request can be sent to the business mobile phone 158 from the personal mobile phone 156 and accepted on the business mobile phone 158. Sending a forward events request can be particularly useful when events are to be forwarded to a plurality of phones, for example all of the phones in a given group, such as a family.

In block 163, the level of information sharing is selected. In this regard, blocks 163a, 163b, 163c, and 163d provide various examples of the manner in which a sharing level can be selected. The details of blocks 163a, 163b, 163c, and 163d are described in more detail below. Sharing levels, also described in more detail below, can range from merely sharing (e.g., forwarding) a notification that an event has occurred on the forwarding phone, to allowing a receiving phone to send and receive information freely with the forwarding phone (e.g., calls, content of text messages, calendar, address book, etc.). It will be appreciated that the event forwarding function 120 can also be configured to automatically select the sharing level if no sharing level is selected by a user. Further details of this feature are also provided below.

Once the personal mobile phone 156 is in the event forward mode and the business mobile phone 158 is configured to accept forwarded events, the event forwarding function of the personal mobile phone 156 will operate to forward messages to the business mobile phone 158, as will now be described.

In block 164, if no event is received the method 160 loops at block 164 until an event is received. When an event is received, the method moves to block 166 where it is determined whether the event is a forwardable event. If the event is not forwardable, the method 160 return to block 164.

A forwardable event can be any type of event. For example, a voicemail, a text message, an electronic mail message, a multimedia message, an alarm, an incoming communication, a notification of a missed event, a calendar event, a reminder, a rss feed update, etc. A user, however, may determine which events are to be forwarded. For example, a user may decide that missed call notifications and voicemail notifications are to be forwarded to the business mobile phone 158 while all other events that are received or occur on the personal mobile phone 156 are not to be forwarded. Thus, a forwardable event is an event that has been approved for forwarding. Of course, a user can approve any or all event types for forwarding.

When a forwardable event has been received in block 166, the event forwarding function 120 determines in block 168 whether the personal mobile phone 156 is connected with at least one other electronic device, in this example, the business mobile phone 158. Connecting can be via Bluetooth or other suitable short-range wireless communication network, such as WiFi for example. If the personal mobile phone 156 is connected with the business mobile phone 158, the event is forwarded to the business mobile phone 158 via the short-range wireless communication network in block 170.

Events forwarded to the business mobile phone 158 are then displayed in block 174 on the business mobile phone 158 for viewing by the user. As will be described in more detail below, events forwarded to the business mobile phone 158 can be displayed on a status bar along with events received by the business mobile phone 158 from the communication network 150 (e.g., events sent from the communications network 150 intended for the business mobile phone 158). Upon receipt of an event forwarded from the personal mobile phone 156, the business mobile phone 158 can display an alert such as an audio or visual alert. The alert can be a different alert than the alert used to indicate an event received by the business mobile phone 158 (e.g., sent from the communications network 150 intended for the business mobile phone 158) so as to indicate to the user that the event is a forwarded event.

If the personal mobile phone 156 is not connected with the business mobile phone 158, then in block 172 the event is stored in a queue for forwarding to the business mobile phone 158 when connected therewith. In this regard, the method loops back to block 168 until the personal mobile phone 156 and the business mobile phone 158 are connected. Such a situation can occur, for example, when the personal mobile phone 156 is left in a user's office while the user attends an offsite meeting with the business mobile phone 158. It will be appreciated that multiple events can be stored in the queue at any given time. Upon return to the office, any events in the queue of the personal mobile phone 156 will be forwarded to the business mobile phone 58 when the phones are connected. Connection between the phones can occur automatically upon the phones coming into range of each other.

It will be appreciated that events stored in the queue can be cancelled therefrom prior to being forwarded to the business mobile phone 158. For example, once a user reviews any events stored in the queue on the personal mobile phone 156, such events can be cancelled from the queue and therefore not forwarded to the business mobile phone 158. For example, in the situation just described, if the user returns to the office and reviews events on the personal mobile phone 156 prior to the mobile phones being connected, then the events can be cancelled from the queue. Events stored in the queue also can expire after a prescribed period of time, after which the forwarding function 120 automatically cancels the events from the queue.

It also will be appreciated that forwarded events not only can be forwarded directly from one electronic device to another by the short-range wireless communications network as described, but also can be forwarded via the communications network 150. In this regard, the server 152 and event forwarding support function 154 can be configured to receive a forward request from the forwarding function 120, and to forward a copy of the event to one or more electronic devices. Accordingly, such a configuration can be used to forward events even when the electronic devices are out of range (e.g., too far apart for operation of the short-range wireless communications network).

It will be appreciated further that events can be forwarded to more than one electronic device. By way of example, events can be forwarded to several electronic devices such as all of the phones in a group. For instance, a family can connect their phones such that an event received by one family member is forwarded to all other family members' phones. Further, parents can configure their phones to forward events to each other received from their childrens' phones so that both parents can be kept informed of communications from their children without the children having to contact both parents separately. By way of yet another example, one user may have two electronic devices and may have both electronic devices forwarding events to each other, for instance one personal mobile phone and one business mobile phone.

When establishing connections between a forwarding electronic device and one or more receiving electronic devices, the event forwarding function 120 can be configured to automatically detect new electronic devices as such devices come into range and query a user regarding adding such a device to the device. If a user wishes to include such new electronic device, a request can then be sent to the new electronic device, for example, as described previously. Further, as electronic devices come into range the event forwarding function 120 can automatically detect and connect with such devices. In this regard, once a particular electronic device has been approved or otherwise authorized for connection, the forwarding function 120 can automatically connect and forward events once the device is within range.

Figure 13:
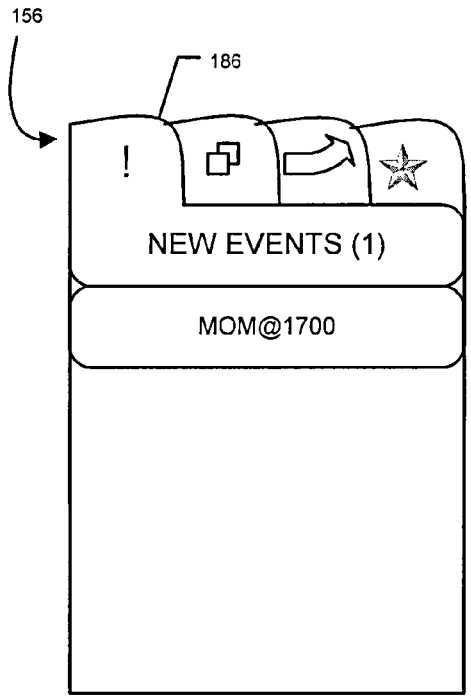
FIG. 13 is an illustration of a status bar of the personal mobile telephone of FIG. 11.
Figure 14:
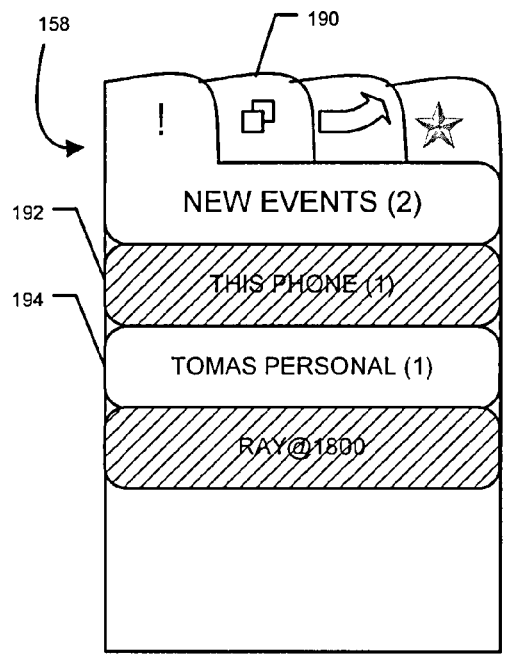
FIG. 14 is an illustration of a status bar of the business mobile telephone of FIG. 11.
Figure 15:
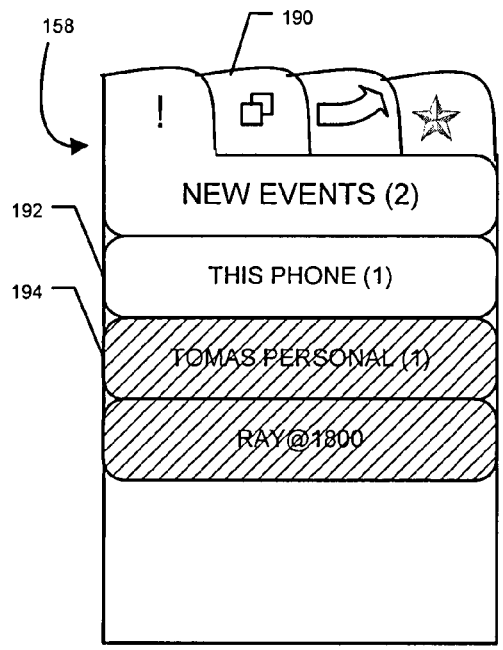
FIG. 15 is another illustration of the status bar of the business mobile telephone of FIG. 11.

Turning now to FIGS. 13-15, status bars of the personal mobile phone 156 and business mobile phone 158 are illustrated. It will be appreciated that the illustrated status bars are merely one manner in which events received by a phone, including forwarded events, can be displayed to a user. Such illustrations are provided for exemplary purposes only. The status bar displays information about the operation of the personal mobile phone 156 such as events, signal strength, calendar information, appointments, time and date, etc.

In FIG. 13, a status bar 186 of the personal mobile phone 156 is illustrated. The status bar 186 indicates one new event has been received by the personal mobile phone 156 from the communications network. The new event appears on tab 188 as "MOM@1700". The received event could be a missed call, a text message, email, etc. sent by "MOM" and received on the personal mobile phone 156 at 1700 hours.

In FIGS. 14 and 15, a status bar 190 of the business mobile phone 158 is illustrated. It will be appreciated that the personal mobile phone 156 is configured to forward events to the business mobile phone 158 as previously described, and accordingly the event "MOM@1700" has been forwarded to the business phone 158. Therefore, the status bar 190 of the business phone 158 indicates two new events have been received. One event is indicated in the "This Phone" tab 192 and the other event is indicated in the "Tomas Personal" tab 194. The first event ("Ray@1800") was received by the business mobile phone 158 (e.g., from the communications network) as indicated by the crosshatching.

In FIG. 15, another illustration of the status bar 190 of the business mobile phone 158 is shown, but in this case the personal mobile phone 156 events are selected and displayed as indicated by the crosshatching. Accordingly, the event "MOM@1700," originally received by the personal mobile phone 156 via the communications network and forwarded to the business mobile phone 158, appears on the status bar 190 of the business mobile phone 158. As mentioned, forwarded events can be displayed in a variety of different ways and the above-described is merely one exemplary manner of displaying forwarded events.

Returning to FIG. 12, and as mentioned with respect to block 163, it will be appreciated that privacy and/or technical limitations, for example, can affect the types of events and information that the event forwarding function 120 shares (forwards) with connected electronic devices. Accordingly, configuration of the event forwarding function 120 can include determining the types and amount of data that will be forwarded (e.g., block 163).

For example, block 163a refers to selecting a predefined sharing level. For example, a first predefined sharing level can include merely an indication that an event has occurred, such as a missed call, voicemail, text message, etc. Merely an indication that an event has occurred can, for example, be just displaying an icon describing the event, for example an envelope for a text message, a red arrow for a missed call, etc. This sharing level typically requires the least amount of data to be transferred between the phones via the short-range wireless network. Accordingly, the event forwarding function 120 can be configured to automatically default to the first sharing level if the short-range wireless communication network has a weak or limited signal (connection). Further, by providing merely an indication that an event has occurred, no personal information is exchanged between the phones. Accordingly, such first sharing level may be appropriate in instance where sharing personal information is not desired.

A second predefined sharing level can further include additional information such as the text of a text message, the number and/or name of a missed call, etc. Such data can be forwarded over the short-range wireless communication network as described.

A third predefined sharing level can further include the ability for a recipient phone to not only read a forwarded text message, email, etc., but also to respond. Further, the ability to answer an incoming call on a recipient phone can be provided by establishing a streaming link, for example, between the phones over the short-range wireless network. In this regard, the recipient phone can act as a headset for the forwarding phone, while the forwarding phone carries out functions and/or communicates with the communications network.

A fourth predefined sharing level can essentially allow any and all functions of the first phone to be accessed and/or carried out by the second phone.

It will be appreciated that each sharing level will typically have a certain set of event types that will be shared. Accordingly, in block 163b, a user can be provided with the option to select and/or deselect the event types for a given selected sharing level that will be shared. For example, if the third sharing level described above is selected in block 163a, then a user can choose to deselect text messages in block 163b. Accordingly, all events described above in connection with the third level of sharing will be forwarded except for text messages.

Another option available to a user for controlling the type of information to be forwarded is presented in block 163c wherein events from certain senders can be blocked. For example, a user may choose to block all events received from a certain individual from being forwarded.

Block 163d sets forth yet another option for controlling the types of information to be forwarded. User customization can include a wide range of options. For example, a user can dictate the time of day and/or days of the week events are to be forwarded. In this regard the event forwarding function can include a rules "wizard" for creating rules regarding the forwarding of messages. For example, a user could create a rule that events are to be forwarded only on weekdays and then only during working hours. Alternatively, a user could create a rule that only events including or excluding certain key terms are to be forwarded.

It will be appreciated that the event forwarding function 120 can include filters for filtering events to be forwarded. In this regard, a user can predefine the events that are to be forwarded. For example, events received on a forwarding phone from a certain sender can be blocked from being forwarded to a receiving device. Thus, even if the event forwarding function 120 is operating and the phone is connected with another phone, events from a blocked sender will not be forwarded. Such a feature can be particularly useful for keeping certain communications from certain senders, for example, private.

The event forwarding function 120 can also be configured to encrypt forwarded messages and/or to require a password or passcode to be entered on the receiving device in order to review the forwarded event. In this manner, a user can ensure that even if events are forwarded to another device, the event cannot be viewed without prior authorization (e.g., provision of the password or passcode). For example, all forwarded messages can be password protected with each requiring entry of the password prior to display and viewing on the receiving phone.

It will be appreciated that although the above description refers to forwarding events from a first phone to a second phone, the event forwarding function 120 can implemented in both phones so as to be a two-way operation wherein connected phones are configured to forward events to the each other. Accordingly, in the example described above, both the personal mobile phone 156 and the business mobile phone 158 can be configured for forwarding events to each other.

It will be appreciated that the term "audiovisual content" broadly refers to any type of audio-based and/or video-based subject matter and may be take the form of a stored file or streaming data. Stored files may include, for example, an image file (e.g., a photograph), a music file, a ring tone, a video file, and so forth and may be stored locally by a memory of the electronic device or remotely, such as by a server. Streaming data may relate to a service that delivers audio and/or video for consumption by the electronic device and may include, for example mobile radio channels or mobile television channels. As used herein, the term "audiovisual content" expressly excludes call related operation of the electronic device 10 (e.g., generation of calling tones and/or the display of numbers or contact data on a display in connection with making or receiving a call) and expressly excludes electronic device operational functions unrelated to audio and/or video playback functions, such as menu navigation, manipulating electronic device settings, contact list management, message functions, photography functions, Internet usage functions, and so forth.

Although the invention has been shown and described with respect to certain preferred embodiments, it is understood that equivalents and modifications will occur to others skilled in the art upon the reading and understanding of the specification. The present invention includes all such equivalents and modifications, and is limited only by the scope of the following claims.

What is claimed is:

1. A method of forwarding a notification of an event received on a mobile phone comprising:
    receiving the event on a first mobile phone;
    determining whether the first mobile phone is connected to at least one other mobile phone via a local short-range radio communication interface;
    if the first mobile phone is connected to the at least one other mobile phone, forwarding a notification of the occurrence of the event to the at least one other mobile phone via the short-range radio communication interface; and
    if the first mobile phone is not connected to the at least one other mobile phone, storing a notification of the occurrence of the event in a memory queue of the first mobile phone until the first mobile phone is determined to be connected with at least one other mobile phone, and upon connection of the first mobile phone to the at least one other mobile phone, forwarding the stored notification of the occurrence of the event via the short-range radio communication interface from the memory queue to the at least one other mobile phone;
    displaying the notification on a display of the at least one other mobile phone when connected therewith; and
    encrypting the notification of the occurrence of the event prior to forwarding.

2. A method as set forth in claim 1, wherein the event includes at least one of a call, a voicemail, a text message, an electronic mail, a multimedia message or an alarm, an incoming communication, a calendar event, a reminder, a RSS feed update, or a notification of a missed communication.

3. A method as set forth in claim 1, wherein the local short-range radio communication interface is a Bluetooth network.

4. A method as set forth in claim 3, wherein the local short-range radio communication interface is a wireless local area network.

5. A method as set forth in claim 3, wherein the local short-range radio communication interface is an IEEE 802.11 network.

6. A method as set forth in claim 1, further comprising displaying the encrypted forwarded notification of the occurrence of the event only upon entry of a passcode.

7. A method as set forth in claim 1, further comprising selecting a sharing level to determine the types of information that are forwardable.

8. The method as set forth in claim 1, wherein the at least one other mobile phone includes a status bar, and wherein displaying the notification on the display includes:
    displaying the notification of the occurrence of the event on the status bar.

9. The method as set forth in claim 8, further comprising displaying a notification of an occurrence of an event received by the at least one other mobile phone from a communications network on the status bar.

10. A method of forwarding a notification of an event received on a mobile phone comprising:
    receiving the event on a first mobile phone;
    determining whether the first mobile phone is connected to at least one other mobile phone via a local short-range radio communication interface;
    if the first mobile phone is connected to the at least one other mobile phone, forwarding a notification of the occurrence of the event to the at least one other mobile phone via the short-range radio communication interface; and
    if the first mobile phone is not connected to the at least one other mobile phone, storing a notification of the occurrence of the event in a memory queue of the first mobile phone until the first mobile phone is determined to be connected with at least one other mobile phone, and upon connection of the first mobile phone to the at least one other mobile phone, forwarding the stored notification of the occurrence of the event via the short-range radio communication interface from the memory queue to the at least one other mobile phone;
    displaying the notification on a display of the at least one other mobile phone when connected therewith; and
    analyzing the event to determine whether an event is a forwardable event for which a notification of the occurrence of the event can be forwarded.

* * * * *